United States Patent
Slater et al.

(10) Patent No.: US 6,954,834 B2
(45) Date of Patent: Oct. 11, 2005

(54) DATA BACKUP INCLUDING TAPE AND NON-VOLATILE MEMORY UNITS AND METHOD OF OPERATING SAME

(75) Inventors: Alastair Michael Slater, Malmesbury (GB); Mark Robert Watkins, Bristol (GB); Andrew Michael Sparkes, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 97 days.

(21) Appl. No.: 10/189,772

(22) Filed: Jul. 8, 2002

(65) Prior Publication Data

US 2003/0014605 A1 Jan. 16, 2003

(30) Foreign Application Priority Data

Jul. 7, 2001 (GB) .............................................. 0116686

(51) Int. Cl.[7] .............................................. G06F 12/16
(52) U.S. Cl. .................................................... 711/162
(58) Field of Search ........................ 711/162; 707/204; 714/6

(56) References Cited

U.S. PATENT DOCUMENTS

| | | | | |
|---|---|---|---|---|
| 5,034,914 A | * | 7/1991 | Osterlund | 710/52 |
| 5,659,550 A | * | 8/1997 | Mehrotra et al. | 714/721 |
| 5,802,398 A | | 9/1998 | Liu et al. | |
| 5,805,921 A | | 9/1998 | Kikinis et al. | |
| 5,822,184 A | | 10/1998 | Rabinovitz | |
| 6,012,109 A | * | 1/2000 | Schultz | 710/56 |
| 6,161,169 A | | 12/2000 | Cheng | |
| 6,282,610 B1 | * | 8/2001 | Bergsten | 711/114 |
| 6,353,878 B1 | * | 3/2002 | Dunham | 711/162 |
| 6,434,323 B1 | | 8/2002 | Hayashi | |
| 6,463,502 B1 | * | 10/2002 | Hyytiainen | 711/111 |

FOREIGN PATENT DOCUMENTS

| | | |
|---|---|---|
| JP | 10-341389 | 12/1998 |
| WO | 90/06582 | 6/1990 |
| WO | WO 02/12993 | 2/2002 |

OTHER PUBLICATIONS

Patent Abstract of Japan Publication No. 58–144270, Publication Date Aug. 27, 1983.
Patent Abstract of Japan Publication No. 11–102262, Publication Date Apr. 13, 1999.

* cited by examiner

*Primary Examiner*—Hiep T. Nguyen

(57) ABSTRACT

A tape drive assembly for performing a backup operation has a tape receiving station to receive a data storage unit including a tape to store data in a data backup operation. A write head writes data to the tape in a data backup operation. A non-volatile memory unit records data in a data backup operation and communicates data to the write head. An input connected to a data host machine passes data to the memory unit such that, in use in a data backup operation, the data are communicated from the data host machine to the input and recorded in the memory unit prior to the data being passed from the memory unit to the write head for writing to the tape.

37 Claims, 7 Drawing Sheets

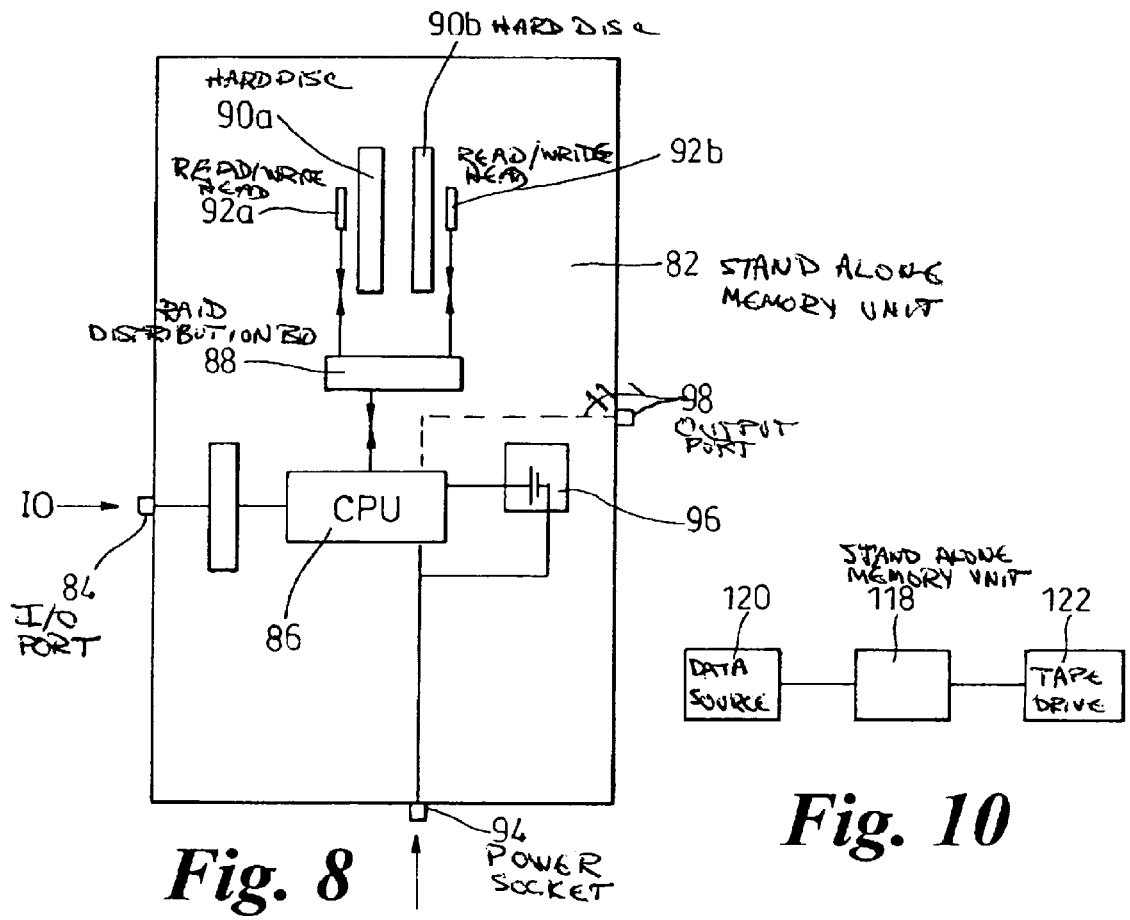
Fig. 8
Fig. 10
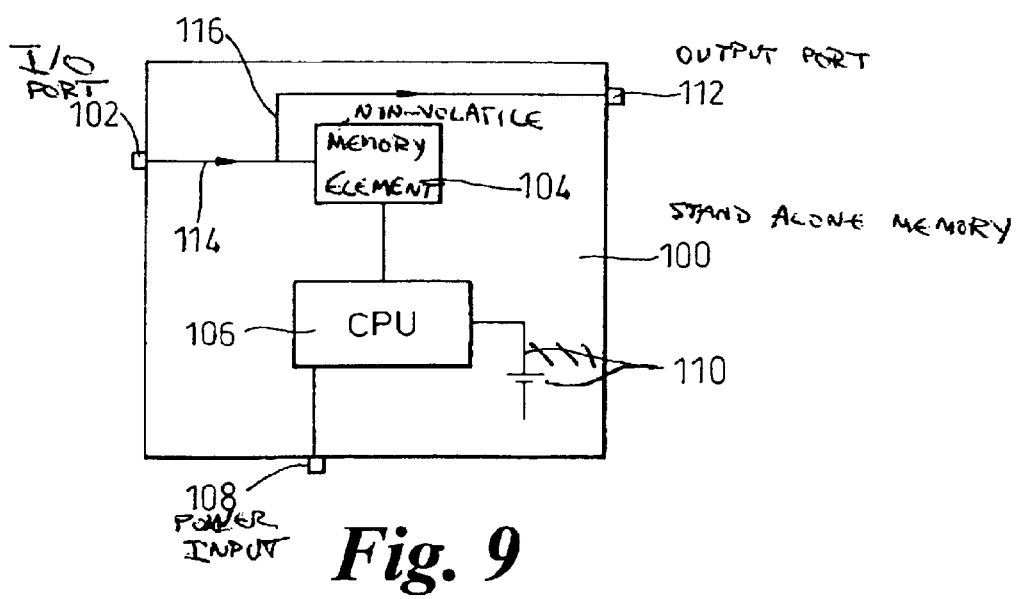
Fig. 9

DATA BACKUP INCLUDING TAPE AND NON-VOLATILE MEMORY UNITS AND METHOD OF OPERATING SAME

FIELD OF THE INVENTION

This invention relates to data backup methods, and to data backup devices.

BACKGROUND OF THE INVENTION

It is common for an organisation to wish to securely and quickly save data, for example transactional data, or changes to data made during a period. A backup data copy is created in case the primary data file is damaged in some way or is lost. In many organisations this is done by copying a database/data records to tape in a separate, often overnight, data backup operation, typically whilst users are not altering the data. It is also common to have backup data records deliberately stored at a different geographical site than that at which the primary data file is stored. For example, backup tapes may be taken home with senior information technology (I.T.) staff, or a backup data record may be made over a wide area network (WAN) to keep it in a different physical location.

For some organisations there is a difficulty in reliably backing up their overnight data. If the volume of data to be backed up is large (and sometimes it could be 50 GB or more) it might take something of the order of 4 hours or so to back it up onto tape. Some organisations may have a long working day: for example from 6.00 a.m. to 10.00 p.m. This leaves only 8 hours to perform the backup. This is usually long enough. However, if there is a problem backing up the data the backup can run out of time to complete the backup operation before organisation wishes to start changing the original data again. For example, if a tape drive performs two hours of a backup operation and then starts to get repeated data error signals it may cancel that backup and start again. If this happens again (and possibly again) then no backup may have been completed by the time that the organisation opens for business the next morning. This leaves the I.T. manager with a choice: deny personnel access to their computers (or at least those functions that will alter the data being backed up until the backup is complete), or allow the "live" data to be modified without there being a backup of the previous day's data/changes to the data.

The first option is hardly ever attractive. The second option is also not attractive, but is often the only practical possibility.

Possible solutions to this problem include manning the backup facility overnight so as to have human intervention/input to problems (most overnight backups are performed with no humans present to oversee them), but this is not popular with the people involved.

Another possibility is to make the backup operation faster so that more re-tries are possible in any given period.

There is a common drive in service provider computer environments to architect the I.T. infrastructure to avoid having a single point of failure. Current tape library arrangements, for example in the backup scenario described, are not fault tolerant. The tape drive is often a single point of failure. If there is a problem with the tape drive then the whole data storage tape library fails. It is known to avoid this by using RAIT technology (Redundant Array of Inexpensive Tapes). However, the "inexpensive" part of RAIT is a misnomer: having multiple tape drives, each with their own array of tapes and an automatic tape changer, is very expensive. Furthermore, if a backup is distributed over several tapes there is then a need to keep a set of tapes together: to associate them in some way. This also is inconvenient for the person taking out of the building the backup tapes since they now have a bundle of tapes.

Tape is the preferred medium for storing backup data because it is cheap, robust, and can be removed from the tape drive and re-inserted many times. Tape cassettes can withstand the treatment given to them (e.g. put in a bag or case, thrown in the car, driven around/shook up, left in warm/cold environments) and still be inserted/removed from a tape drive very many times before the insertion/removal operation, or simply their use once inserted, wears them out. They can also store a lot of data.

Floppy discs can be inserted/removed from a disc drive, but they are less robust, and may not withstand the insertion/reinsertion so many times, and currently cannot store so much data.

Whilst removable hard discs exist, they are very expensive and are less robust, and are not designed for regular, repeated, insertion/removal every day for a year, or years.

Furthermore, if a tape physically breaks it is often possible to read data at regions of the tape away from the break. If a disc physically breaks that is far from easy to do (if it is possible at all). Thus tapes also have a greater chance of being able to have data recovered from them in the event of a physical accident to the data carrier.

A number of prior art arrangements of data protection are known, see for example JP 1100102262, where data stored in a hard disc at a main host computer is stored on an off-site tape library. JP 580144270 discusses another data storage device. WO 90/06580 deals with a tape drive and a disc drive mounted in the same housing having common control circuitry. Also, U.S. Pat. No. 5,822,184 shows a tape and disc drive being mounted in the same housing.

U.S. Pat. Nos. 6,161,169 and 5,805,921 disclose bus/buffer management algorithms and techniques.

SUMMARY OF THE INVENTION

It is an aim of the present invention to provide an improved method or apparatus for data storage, data backup, and/or data recovery.

According to a first aspect, the invention comprises a tape drive assembly for performing a backup operation, comprising:

a tape receiving station arranged to receive a data storage unit including a tape arranged to store data in a data backup operation;

a write head arranged to write data to said tape in a data backup operation;

a non-volatile memory unit adapted to record data in a data backup operation and adapted to communicate data to said write head;

an input adapted to be connected to a data host machine; said input being arranged to pass data to said memory unit such that, in use in a data backup operation, said data is communicated from said data host machine to said input and is recorded in said memory unit prior to said data being passed from said memory unit to said write head for writing to said tape.

According to another aspect of the present invention there is provided a tape drive assembly comprising:

a tape receiving station arranged to receive a data storage unit including a tape arranged to store data;

a write head arranged to write data to said tape;

a non-volatile memory unit adapted to record data and adapted to communicate data to said write head;

an input;

said input being arranged to pass data to said memory unit such that, in use, said data is recorded in said memory unit prior to said data being passed from said memory unit to said write head for writing to said tape.

The memory unit may be a hard disc. The hard disc may have a data storage capacity of the order of any of the following figures, or of between any pair of the following: 25 GB, 50 GB, 75 GB, 100 GB, >100 GB, of the order of TB, or more. Alternatively, the memory unit may be a solid state device, for example SRAM, E²PROM or flash card. The memory unit may be a log.

This allows a short term, typically a few hours, backup of the complete dataset to be made to a non-volatile storage medium from which data can be recovered (e.g. to tape or indeed to recover a system from the data held therein) should the backup to tape fail.

There may be a processor, which may be arranged to control the passage of data to the write head and the memory unit. The processor may be situated within or nearby the tape drive assembly. The processor may be arranged to replicate the data and the data may be passed to the write head and the memory unit in parallel. Alternatively, the data may be passed to the write head and the memory unit, or vice versa, in seriatim.

There may be a plurality of memory units. The memory units may be arranged in a redundant array of inexpensive (RAI) memory units, where the memory units are discs, this may be a RAI Discs (RAID) arrangement.

The memory elements may be arranged to mirror data recorded thereupon, in use, for example discs in a RAID 1 arrangement.

There may be an output from the memory unit. The output may be arranged to allow the download of data stored within said memory unit. A data storage device may be arranged to receive said stored data. The storage device may be a tape unit, which may be received in said receiving station. Alternatively a server, or a terminal (e.g. a P.C) may be arranged to receive said stored data The tape drive assembly may form part of a tape library. The tape library drive may include a plurality of tape drive assemblies. There may be a plurality of tape data storage units associated with said tape library. There may be a tape changer arranged, in use, to remove and insert tapes from the tape drive assembly. Said tape changers may be part of said tape library. The tape changer may be adapted to change a tape automatically. There may be tens of tapes, or more, in the tape library for each tape drive assembly.

There may be a multiplexer. The multiplexer may be arranged to multiplex incoming data signals either before or after the signals have been written to the non-volatile memory element, in use.

The assembly may be arranged to issue a warning should either or both of the memory unit or the tape drive fail. The warning may be audible or it may be visual. The assembly may be arranged to issue a warning to a remote management console, typically via a network.

According to another aspect the invention comprises a method of backing up data stored on a host data-containing machine comprising the steps of:

i) receiving data from said host machine at an input of a tape drive assembly;

ii) passing said data to a non-volatile memory unit;

iii) routing said data through said memory unit and recording said data in said memory unit;

iv) passing said data to a write head of said tape drive assembly; and v) attempting to write said data to a tape data storage medium to backup said data to said tape data storage medium.

Steps ii) and iii) and steps iv) and v) of the method may be executed substantially simultaneously. Alternatively, steps ii) and iii) of the method may be executed in seriatim with steps iv) and v), or vice versa.

The method may include storing the data in the memory unit as a buffer. The method may include recovering the data from the memory unit should the data not be successfully written to the tape.

The method may include executing steps iv) and v) of the method only if step iii) Should fail, possibly only if step iii) should fail. The method may include executing a step of read after write data verification after step iii). This may serve to determine if step iii) has failed or not.

The method may include establishing a data set to be backed up and executing steps ii) and iii) until all of said data set to be backed up is stored upon said memory unit.

The method may include allowing random, or multi-point, access to the memory unit. This may enable access to and/or export of a selected portion of the stored data, preferably without having to run the portion of the data storage medium past the read head prior to reading/exporting the selected portion. The method may include selecting a portion of the stored data to be accessed/export in response to an automated, or user input, signal.

The method may include providing the memory unit in the form of a hard disc. Alternatively, the method may include providing the memory unit in the form of a solid state device, for example SRAM, E²PROM or flash card.

The method may be performed in conjunction with a control processor and the tape drive assembly may include said memory unit as an integral unit or a combined assembly, and a control processor may be associated with said memory unit or said tape drive assembly. In such an arrangement, the control processor receives a backup operation initiation signal, and upon receipt thereof causes a backup operation to be performed, thereby backing up said data.

The method may include controlling the passage of data to the write head and the memory element with said processor.

The method may include providing a plurality of memory units, possibly in an RAI arrangement. The method may include mirroring the data written upon said plurality of discs/RAI memory units.

The method may include providing an output from the memory unit. The method may include allowing the download of data stored within the memory unit. The method may include providing a data storage device arranged to receive said stored data. The method may be performed in a system in which said data storage device is in the form of a tape and includes a server, or a terminal (e.g. PC), arranged to receive said stored data.

The method may include multiplexing data either before or after it has been written to the non-volatile memory unit.

The method may comprise overwriting data previously stored in said non-volatile memory unit from an earlier backup operation with data from a later backup operation.

The method may further comprise determining if a problem has been detected indicating that backup to said tape data storage medium has failed to be achieved properly;

if no determination of backup to tape data storage medium has failed to be achieved properly in the immediately preceding step, a subsequent backup operation is allowed to overwrite data stored in said non-volatile memory unit from a previous backup operation with data from said subsequent backup operation.

The method may further comprise:

inserting another tape into said tape drive;

determining if data was successfully backed up to tape during said first backup routine;

performing a second backup routine, subsequent to said first backup routine and after said data set in said host machine has changed; and overwriting data stored in said non-volatile memory element during said first backup routine with a new data set from said host machine during said second backup routine, said second backup routine also writing said new data set to said another tape.

The method may comprise performing a specific backup operation and ensuring that said non-volatile memory unit has a large enough capacity to store an entire data set that is to be backed up in said backup operation.

Preferably said non-volatile memory unit has a large enough capacity to store at least two data sets from at least two successive backup operations, or possibly 3, 4, 5, 6, 7, or more backup data sets.

The method may be performed on a data set to be backed up of a generally known predetermined size and in a non-volatile memory unit large enough to store the whole of data from a plurality of back up operations. In such a situation, a plurality of successive backup operations of said data set are stored in said non-volatile memory unit; and earlier backed-up data are overwritten with new backup data in a first-in-first out manner when there is otherwise insufficient capacity in said non-volatile memory unit to accommodate data from a new backup operation.

According to another aspect the invention comprises a backup non-volatile memory unit comprising a discrete stand-alone unit arranged for use with a tape drive, said assembly further comprising:

a non-volatile memory element;

an input port;

an output port;

said assembly being arranged to receive data via said input port, store said data to said non-volatile memory element, and output said data via said output port to said tape drive.

The input and output port may be combined as an input/output (IO) port. The assembly may include a processor. The processor may be arranged to control the writing of the data to the memory element, in use. The processor may be arranged to control the reading of the data from the memory element, in use. The processor may have a buffer. The buffer may be arranged to store the data temporarily, typically for a few ms, in use. The processor may be arranged to control the flow of data through the assembly, in use. The processor may be arranged to output some or all of the data, in use.

The non-volatile memory element may be a hard disc. There may be a plurality of hard discs. The hard discs may be arranged in a Redundant Array of Inexpensive Discs 1 (RAID 1) arrangement. The hard discs may be arranged in a RAID level that provides fault tolerance, for example RAID 1, 3, 5 . . . Alternatively, the non-volatile memory element may be a solid state device, for example SRAM, E$^2$PROM or flash card, or an optical element, such as an optical disc. The non-volatile memory element may be arranged to be removed from the assembly, in use. The non-volatile memory element may be a log.

The assembly may have a power supply which may be independent of the tape drive or tape library. The power supply may have a surge protector. The assembly may have a reserve power supply. The reserve power supply may be internal of the assembly. The reserve power supply may be a battery.

There may be provided a multiplexer. The multiplexer may be arranged to multiplex data either before or after it has been written to the non-volatile memory unit, in use.

The assembly may be arranged to issue a warning should either or both of the memory element or the tape drive fail. The warning may be audible or it may be visual. The assembly may be arranged to issue a warning to a remote management console, typically via a network.

According to another aspect of the present invention there is provided a method of backing up data with a backup arrangement including a tape drive with associated removable tapes and a non-volatile memory element, wherein the method comprises the step of writing data to be backed up to both the tape and non-volatile memory element.

Preferably the tape is removed from the tape drive after completion of the backup.

The method may comprise the step of using the non-volatile memory element as a local backup. The method may comprise the step of using the tape as a remote backup.

The method may be performed with a plurality of hard discs arranged in a Redundant Array of Inexpensive Discs 1 (RAID 1) arrangement and wherein the non-volatile memory element is in the form of a hard disc. In such a situation, the method may comprise the step of arranging the hard discs in a RAID level that provides fault tolerance, for example RAID 1, 3, 5. Alternatively, the method may comprise the step of providing the non-volatile memory element in the form of a solid state device, for example SRAM, E$^2$PROM or flash card. The method may comprise the step of providing the nonvolatile memory element in a removable form, in use.

The method may include multiplexing data either before or after it has been written to the non-volatile memory unit. The method may comprise the step of retrieving the data from the non-volatile memory unit. The method may comprise the step of allowing access to a selected portion of the data stored on the non-volatile memory unit. The method may comprise the step of retrieving data stored upon the tape, typically if retrieval from the non-volatile memory element fails.

Both of the prior art arrangements discussed hereinafter result in the generation of two tape copies of the backed up data. One for 'offsite' storage for data security, for example, in the case of fire and one for easy 'onsite' usage. The present invention allows for the same result to be achieved but with the generation of only a single tape copy for 'offsite' storage. The onsite backup storage is typically provided by a "captive" memory unit that is not usually removed/removable from the data backup unit.

The method may include issuing an interrupt and commencing the writing of the data to the memory unit if a signal indicative of a backup starting is received.

According to another aspect of the present invention there is provided a network comprising a data source, a tape drive assembly and a backup non-volatile memory element.

The non-volatile memory element may be a hard disc. The non-volatile memory element may be internal of and/or integral with the tape drive assembly, in accordance with the first aspect of the present invention. Alternatively, the nonvolatile memory element may be a non-volatile memory assembly provided separately from the tape drive assembly.

The data source may be any one, or combination, of the following: a host computer or machine hosting a database, a network, a disc array, a tape drive, a tape library, a server, a terminal (such as for example a PC) or a network switch (for example fibre channel or Ethernet).

The combination of the tape drive and the non-volatile memory element may operate according to a previously defined method aspect of the present invention. The non-volatile memory assembly may operate according to a previously defined method aspect of the present invention.

According to another aspect the invention comprises a network with elements connected to be responsive to a data source having a data set to be backed up. The elements include a backup unit comprising a tape drive assembly having a read/write head and a backup non-volatile memory element of a capacity such as to be able to accommodate at least one copy of said data set. The tape drive assembly and memory element are in a Common unit having an input communicating with said data source and an output adapted to output data obtained from said tape drive assembly and additionally or alternatively from said memory element. The input communicates data coming from said data source with said memory element for storing said data set at said memory element. The memory element communicates with said tape drive assembly to write said data using said read/write head to a tape located in said tape drive.

According to another aspect the invention comprises a network comprising a data source having a data set to be backed up, and a backup assembly comprising a tape drive assembly and a non-volatile memory unit. The non-volatile memory unit comprises:

a non-volatile memory element of a capacity such as to be able to accommodate at least one copy of said data set;
 a unit input port; and
 a unit output port.

The nonvolatile memory unit is arranged to (1) receive data via said unit input port from said data source, (2) store said data set to said non-volatile memory element, and (3) output said data set via set unit output port to said tape drive assembly.

According to another aspect of the present invention there is provided a tape library comprising at least one tape drive, at least one non-volatile memory element and a plurality of tape data storage units.

The non-volatile memory element may be a hard disc. The non-volatile memory element may be internal of and/or integral with the tape drive assembly, in accordance with the first aspect of the present invention. Alternatively, the non-volatile memory element may be a non-volatile memory assembly provided separately from the tape drive assembly, in accordance with at least part of the third aspect of the present invention.

The combination of the tape drive and the non-volatile memory element may operate according to the method of second aspect of the present invention. Alternatively, the non-volatile memory element may operate according to the method of the fourth aspect of the present invention.

The tape library may comprise a tape autochanger arranged to insert one the plurality of tapes into and remove one of the plurality tapes out of the tape drive, in use.

According to another aspect of the present invention there is provided a method of operating a non-volatile backup assembly including a non-volatile memory unit having a non-volatile memory element, an input and an output; comprising the steps of:

i) connecting the output to an input of a tape drive assembly;
 ii) receiving data at the input from a data source;
 iii) copying the data to the non-volatile memory element; and
 iv) outputting the data from the output to the tape drive assembly.

The method may include the step of releasably connecting the memory unit to the tape drive assembly, wherein the memory unit is located internally or externally of the tape drive assembly. The method may include downloading the data from the memory unit to a different tape drive from that to which the data was output. The method may include providing the non-volatile memory assembly in accordance with the third aspect of the present invention.

According to another aspect the invention comprises a method of performing a backup operation with a non-volatile backup unit having a non-volatile memory element, an input and an output; the method comprising:

i) connecting said output to an input of a tape drive assembly;
 ii) receiving data at said input from a remote data source;
 iii) copying said data to said non-volatile memory element; and
 iv) outputting said data from said output to said tape drive assembly.

Another aspect of the present invention relates to software which runs on a processor of a backup system including both a tape drive, having a data storage medium mounted therein, and a non-volatile memory element. The software is arranged to (1) access data being backed up and (2) copy the data to both the data storage medium and the non-volatile memory element, in use.

The software may be arranged to allow access and/or retrieval of the data from either or both of the data storage medium and the non-volatile memory element, in use.

The non-volatile storage element may be a hard disc. There may be a plurality of hard discs and they may be arranged in a fault tolerant RAID configuration, for example RAID 1, 3, 5

According to further features of the present invention there are provided a method of increasing the speed of access to specific backed up data; and a method of increasing the reliability of a backup.

According to any preceding aspect of the present invention it is preferable that the backup occurs without human intervention (at least after it has been initiated).

It will be appreciated that fault tolerance is a desirable feature in any system and accordingly there may be redundancy, typically in the form of reserve components, incorporated into the tape drive assembly, tape library, or non-volatile memory assembly, or element according to the preceding aspects of the present invention.

BRIEF DESCRIPTION OF THE DRAWINGS

The invention will be described, by way of example only, with reference to the accompanying drawings in which.

18

Figure 3:
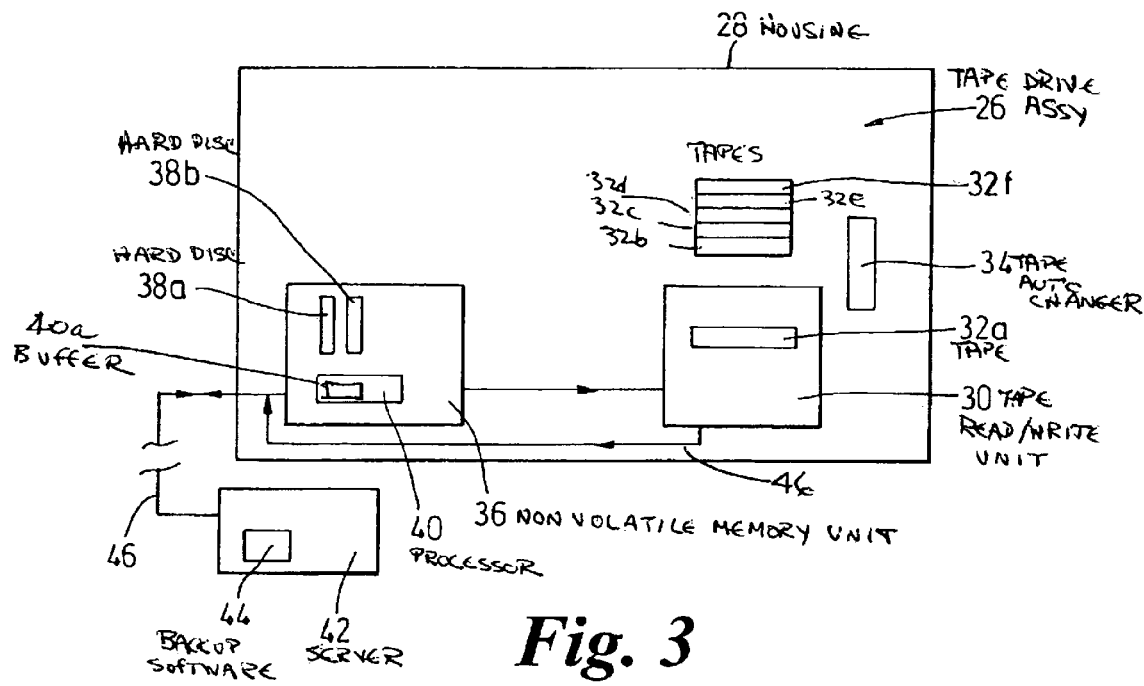
Figure 4:
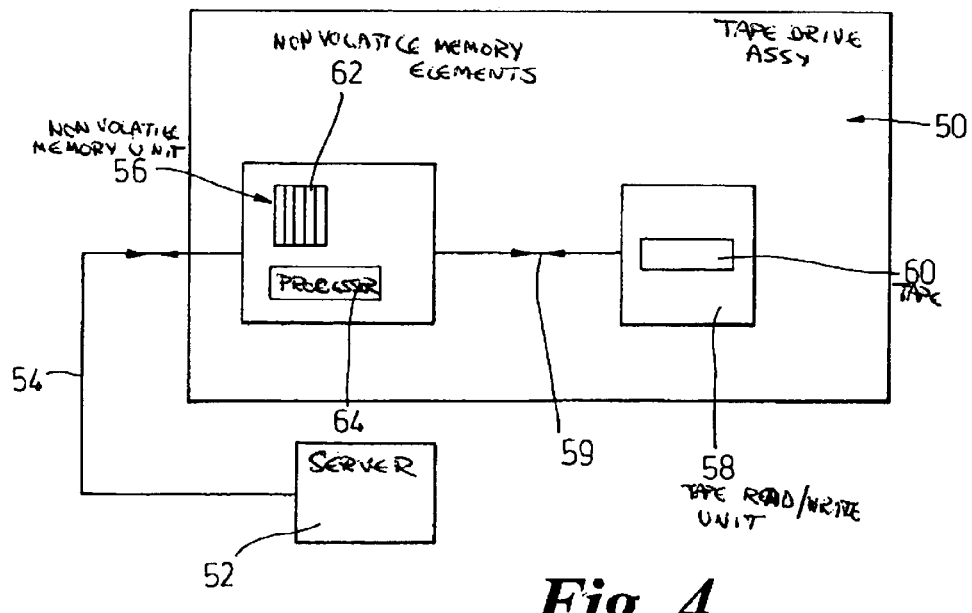
Figure 5:
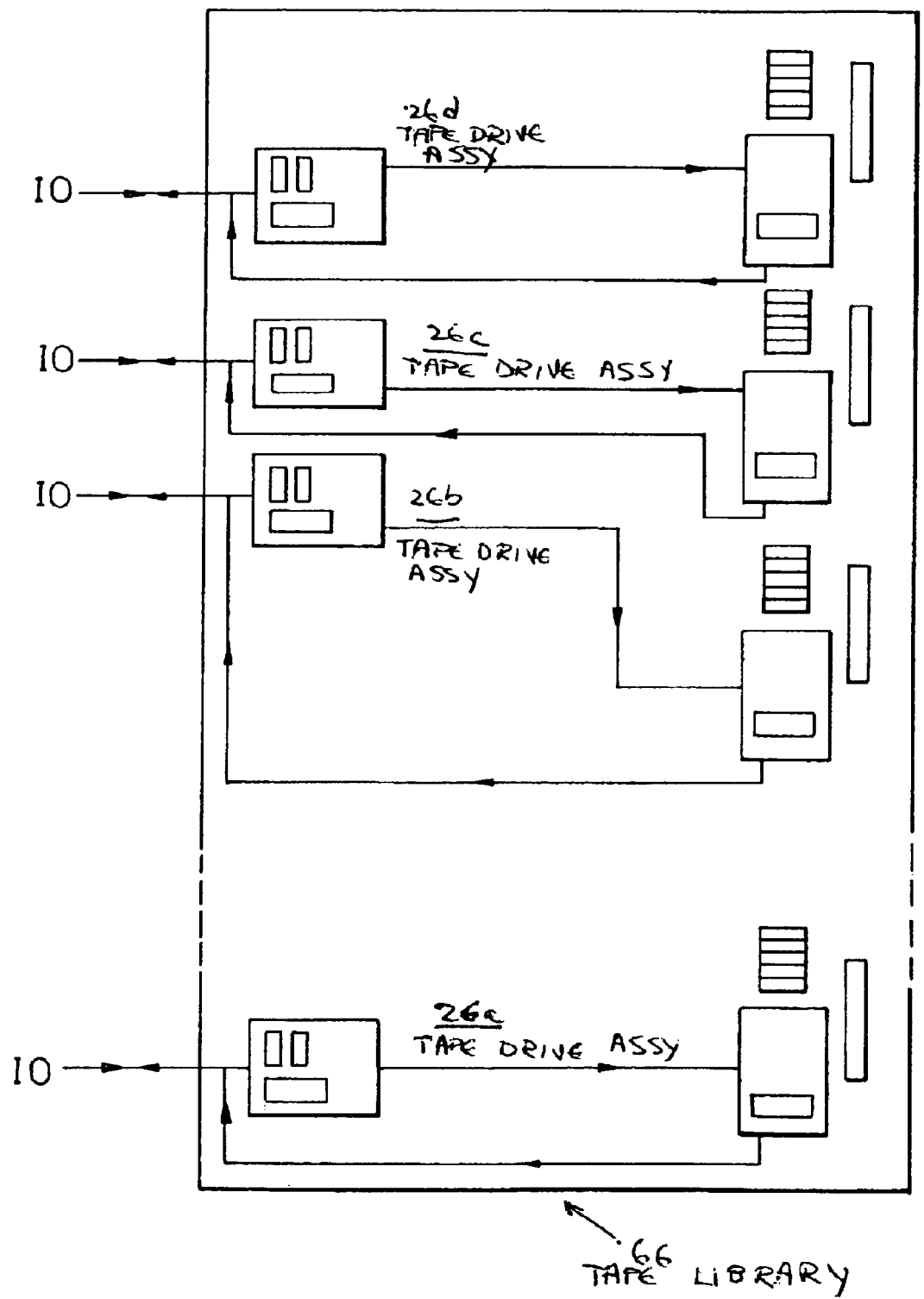
Figure 6:
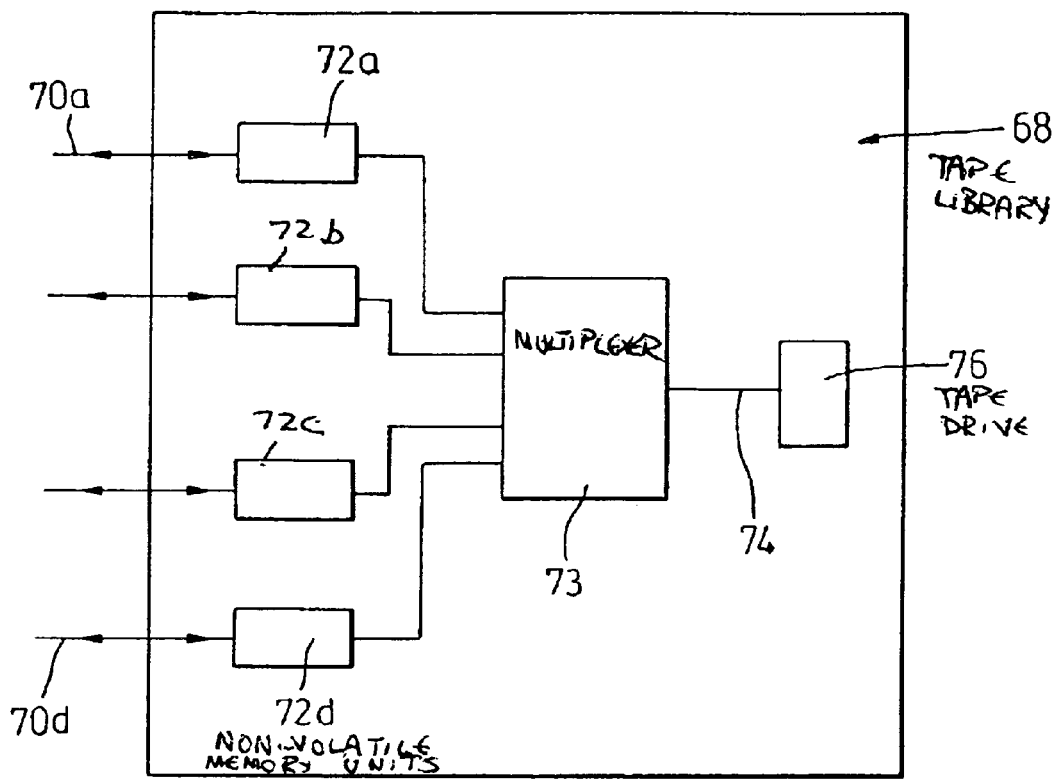
Figure 7:
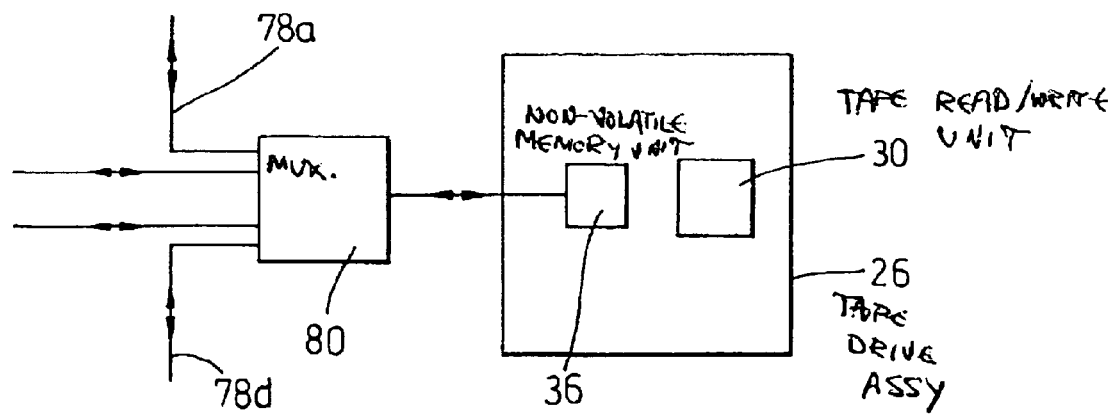
Figure 11:
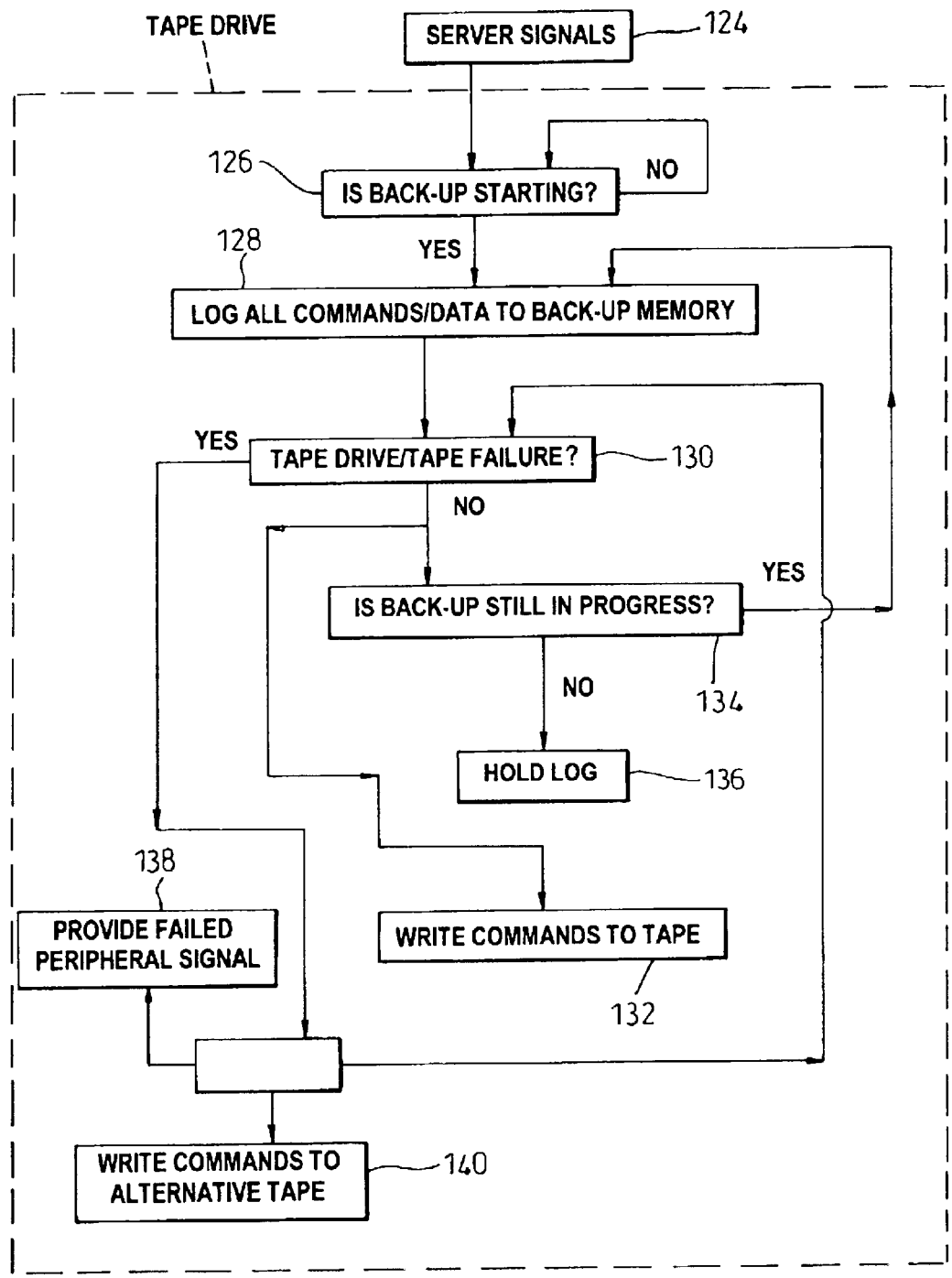
Figure 12:
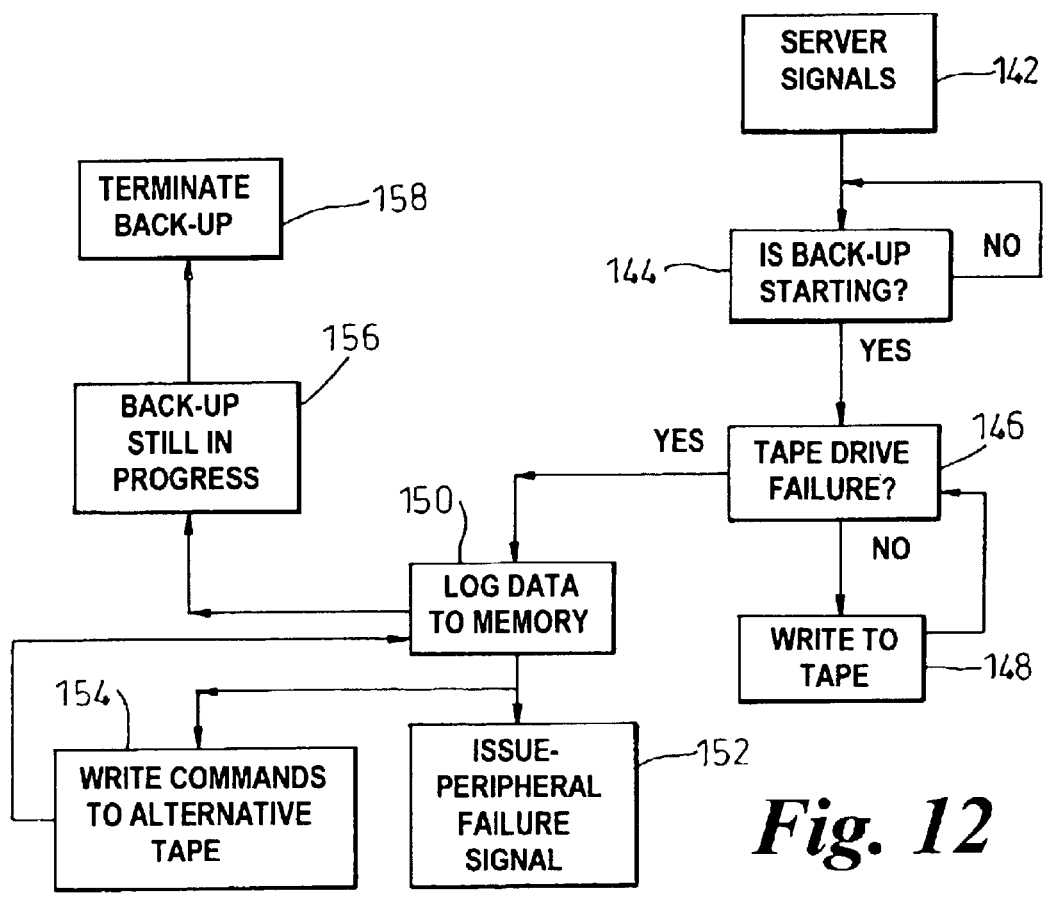
Figure 13:
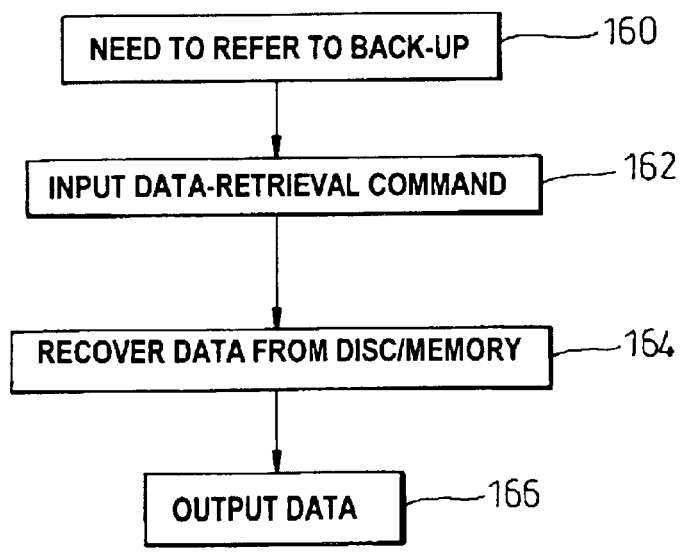

FIG. 3 is a schematic representation of a first embodiment of a tape drive assembly in accordance with an aspect of the present invention;

FIG. 4 is a schematic representation of a second embodiment of a tape drive assembly in accordance with an aspect of the present invention;

FIG. 5 is a schematic representation of a tape library comprising tape drive assemblies in accordance with an aspect of the present invention;

FIG. 6 is a schematic representation of a first embodiment of a multiplexing tape drive assembly in accordance with an aspect of the present invention;

FIG. 7 is a schematic representation of a second embodiment of a multiplexing tape drive assembly in accordance with an aspect of the present invention;

FIG. 8 is a schematic representation of a first embodiment of a stand alone non-volatile memory unit in accordance with an aspect of the present invention adapted for use with a tape drive;

FIG. 9 is a schematic representation of a second embodiment of a stand alone non-volatile memory unit in accordance with an aspect of the present invention adapted for use with a tape drive;

FIG. 10 is a schematic representation showing a non-volatile memory unit of either of FIG. 8 or 9 in use;

FIG. 11 is a flow diagram detailing a method of data backup in accordance with an aspect of the present invention;

FIG. 12 is a flow diagram detailing an alternative method of data backup to that of FIG. 11 in accordance with an aspect of the present invention;

FIG. 13 is a flow diagram detailing a method of data retrieval in accordance with an aspect of the present invention.

DETAILED DESCRIPTION OF THE DRAWINGS

It will be appreciated that the description of the preferred embodiments of the present invention is exemplary only and is intended to provide a thorough understanding. It will be further appreciated by one skilled in the art that the present invention may be executed without limitation to the embodiments described hereinafter and that well known methods and structures have not been described hereinafter, so as not to unnecessarily obscure the present invention.

Figure 1:
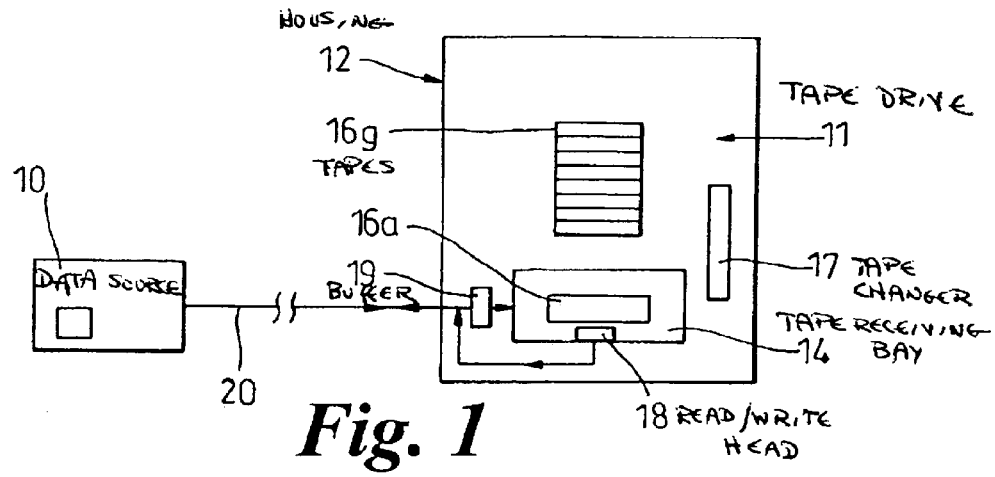
FIG. 1 is a schematic representation of a prior art arrangement for performing a data backup to tape.

Referring now to FIG. 1, which shows a prior art arrangement for performing backups of data from a data source 10, a tape drive 11 comprises a housing 12, a tape receiving bay 14, a plurality of tapes 16a–g a tape changer 17 a read/write head 18, and a buffer 19.

During a backup data is passed between the source 10 and the drive 11 via a data link 20. The data link 20 is typically a SCSI connection or a fiber channel connection.

A tape 16a is placed in the receiving bay 14 and initialised. When backup commences data is passed over the data link 20 to the write head 18 via the buffer 19 and is written to the tape 16a. The data can be verified in the normal way. However, should a fault develop within the tape drive 11 the data source 10 will continue to produce data even though it is not being recorded to the tape and thus a portion of the duration of a backup will be lost. This arrangement presents the tape drive 11 as a single point of failure.

Figure 2:
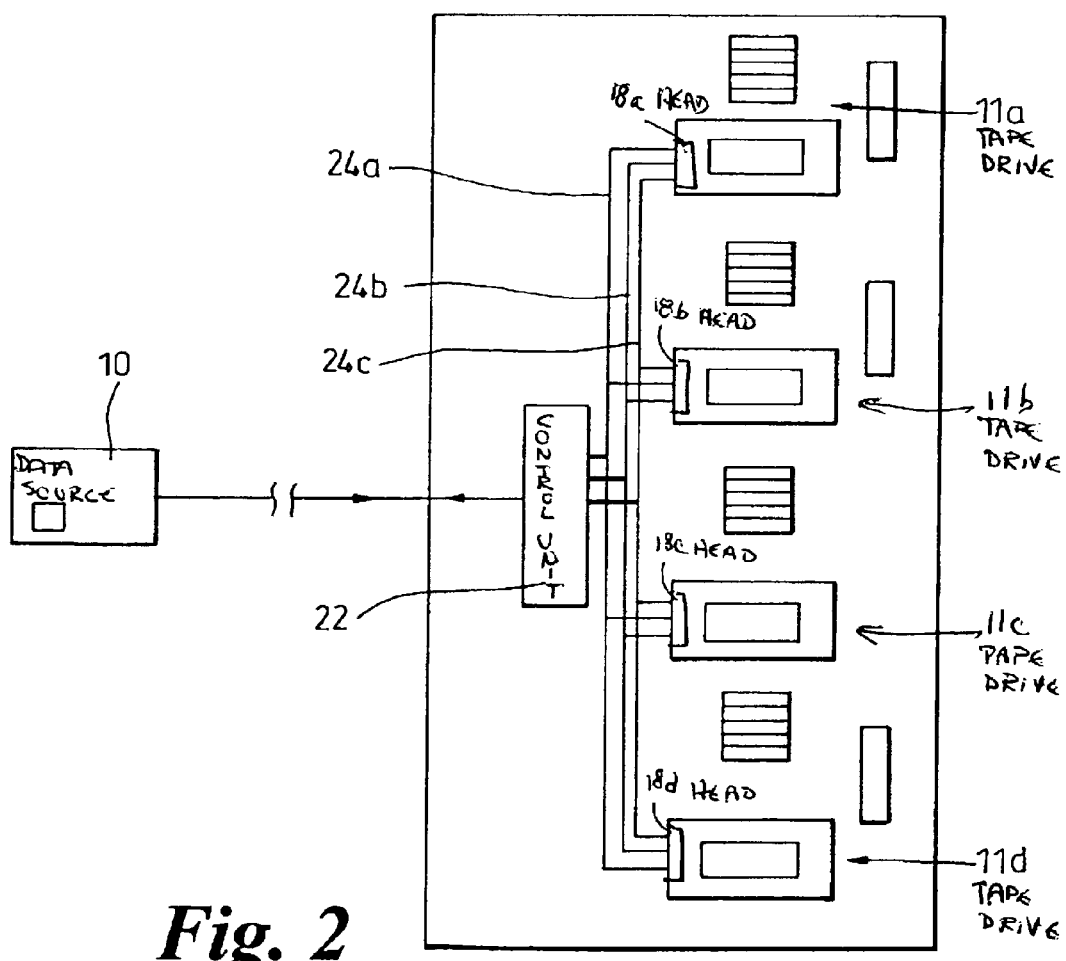
FIG. 2 is a schematic representation of a prior art RAIT arrangement for performing a data backup to tape.

FIG. 2 shows a prior art attempt to reduce the likelihood of a single point of failure of the backup occurring at any single tape drive known as a redundant array of inexpensive tapes (RAIT). In the arrangement of FIG. 2 a four tape drives 11a–d are connected to a control unit 22 by each of three independent data links 24a–c. The control unit 22, typically a slot in card or systems software, receives data from the source 10 and, in this instance, replicates the data. The replicated data is passed via all three of the data links 24a–c to each of the write heads 18a–d. Thus, should any one component of the RAIT arrangement fail the backup can usually complete with at least one backup of the data being successfully completed. The problem with this solution is that the term, inexpensive, is a misnomer, as although the tapes themselves are inexpensive the tape drives are not.

FIG. 3 shows a first embodiment of the present invention, in which a tape drive assembly 26 comprises a housing 28, a read/write unit 30, a plurality of tapes 32a–f, a tape auto-changer 34 and a non-volatile memory unit 36. The memory unit 36 comprises two mirrored hard discs 38a, 38b and a processor 40.

A server 42 has backup software 44 running on it and is connected to the drive assembly 26 via a data link 46. The data link 46 is typically either a fiber channel or SCSI connection.

The backup software 44 initiates the backup of data stored on the server 42 and data is transferred over the data link 46 to the drive assembly 26. The data is passed to the processor 40 where it is replicated. One copy of the data is passed to the read/write unit 30 as will be described hereinafter. A copy of the data is written to each of the mirrored hard discs 38a, 38b, i.e. the discs are in a RAID 1 arrangement. The discs 38a, 38b will typically each have sufficient data storage capacity to store the total amount of data transferred during the backup.

However, if an extremely large amount of data is to be backed up and it is not possible to contain all of the data on a single disc, the processor 40 may switch the discs 38a, 38b from a RAID1 configuration such that one of the discs (for example, disc 38a) is filled with data, and then the other disc 38b is filed sequentially. Alternatively, the processor 40 can partition the data into segments, allocate the segments to either disc and generate a log of where each segment of data is located. This allows particularly important data to be written to both discs as an extra safeguard. This important data will have a flag which is set by the backup software 44, for example, a vendor unique SCSI command, and recognised by the processor 40.

The read/write unit 30 has one of the tapes 32a therein and data passed from the non-volatile memory unit 36 is written to the tape 32a in the conventional manner. The transcription of the data to the tape 32a is verified in a conventional manner. Should the tape 32a become overfull, or fail, the autochanger 34 changes it for another tape 34f, for example, that has spare data storage capacity and has not failed.

The discs 38a, 38b may be large enough to hold enough data to accommodate several data sets (sets of data to be backed up as a back-up record of a database/record on a host system). For example, a week's worth of daily backups may be simultaneously stored on the discs 38a, 38b. However, eventually it will be necessary to overwrite a previous backup record data set with a new backup data set. Typically, the oldest previous data set(s) will be overwritten.

In an alternative arrangement the tape drive assembly 26 data transferred to the assembly 26 is replicated and one copy of the data is temporarily retained by the processor 40 in a buffer region 40a. A further copy of the data is forwarded to the read/write unit 30.

The read/write unit 30 attempts to write the data to the tape 32a in the conventional manner. The unit 30 attempts to verify the data in the conventional manner. Should the verification attempt fail a signal 46 is sent to the memory unit 36 which instructs the processor 40 to commence writing the data to the discs 38a, 38b. The copy of the data stored in the buffer 40a will be the first data block to be written to the discs. Thus, the tape 32a contains all of the data up to the point of failure of the tape drive arrangement and the discs 38a, 38b contain the remainder of the backed up data.

If the data recording to the tape is successful the data written to the buffer region 40a may be overwritten with new data. Alternatively a backup to disc may be taken automatically, irrespectively of whether the backup to tape is successful.

The discs 38a, 38b will typically have sufficient storage capacity to store the entire backup (or several backups, or many backups) in a mirroring, RAIDed, arrangement. Alternatively, the processor 40 can partition and allocate the data between the two discs 38a, 38b as detailed hereinbefore.

The plurality of tapes 32b–f and the autochanger 34 operate in the same manner as in the previously described arrangement.

Referring now to FIG. 4 this shows a second embodiment of the present invention comprising a tape drive assembly 50 connected to a server 52 via a data link 54.

The tape drive assembly 50 comprises an non-volatile memory unit 56 and a tape read/write unit 58 connected via a single connector 59. The read/write unit is shown with a tape 60 therein. The memory unit 56 comprises a plurality of non-volatile memory elements 62 and a processor 64. The memory elements 62 will typically be hard discs although they may include solid state devices such as $E^2$ PROM, SRAM or flash memory.

The server 52 initiates a backup routine and data is transferred from the host machine, or server 52 to the drive assembly 50 via the data link 54. The data is handled in the same fashion as described hereinbefore for the first embodiment.

FIG. 5 includes a tape library 66 comprising a plurality of tape drive assemblies 26a–d as described in relation to the first embodiment.

FIG. 6 shows an alternative arrangement of a tape library 68 in which a plurality of input/output lines 70a–d each have their own non-volatile memory unit 72a–d. The output from each of the memory units 72a–d is fed to a multiplexer 73 where it is multiplexed. A single multiplex data link 74 links the multiplexer 73 to a tape drive 76. The tape drive 76 is the same as that described hereinbefore in relation to the first embodiment.

FIG. 7 shows a further alternative embodiment of a tape library in which multiple data input/outputs lines 78a–d enter a multiplexer 80. The output from the multiplexer 80 is passed to a tape drive assembly 26 as hereinbefore described.

Referring now to FIG. 8, a stand-alone memory unit 82 intended to be an add-on peripheral for current tape drives, comprises an input/output port 84, a processor 86, a RAID distributor board 88, two hard discs 90a,b, two read/write heads 92a,b, a power input socket 94 and a battery 96.

The input/output port 84 is arranged to receive data from a data source, typically a host machine or computer which stores the data and which users of the host machine access during live use of the data by, for example, a business. A typical data source could be a server, or a network. The port 84 is also arranged to transmit data to a connection—a tape drive.

The RAID board controls the mirroring of the data and also the possible partitioning of the data in conjunction with the processor 86.

The processor 86, hard discs 90a,b and read/write heads 92a,b operate as described hereinbefore.

The power input socket 94 receives power either from an a.c. supply, in which case a transformer is an integral part of the socket 94. Alternatively, the socket 94 receives power from a d.c. supply, such as an external transformer or battery pack. The battery 96 acts as a backup power supply should the supply from the socket 94 be interrupted.

The battery 96 will typically have a long enough lifetime to maintain the utility of the memory unit 82 until the power supply via the socket 94 can be re-established.

An optional, additional, output port 98 is shown ghosted. The additional output port 98 can be used to output the data to a second tape drive or to a network.

Referring to FIG. 9, an alternative arrangement of a stand-alone memory unit 100 arranged to be connected to a standard tape drive via a standard input or input/output arrangement comprises an input/output (IO) port 102, a non-volatile element 104, a processor 106, a power input 108, a battery 110 and an output port 112.

A data link 114 connects the IO port 102 directly to the memory element 104. A data link spur 116 is tapped from the data link 114 directly to the output port 112. This increases the speed of operation of the arrangement as no processing of data occurs prior to the transcription of the data to tape via the tape drive assembly. The processor 106 controls the writing of data to the memory element 104.

The output port 112 is connected via a lead or infra-red link to a tape drive.

Referring to FIG. 10, this shows a stand-alone memory unit 118 connected to a data source 120, typically either a server or a network, and a tape drive 122.

The stand-alone memory unit 118 is releasably connected to both the tape drive 122 and the data source 120. The connections can be effected by cables with suitable heads such as Ethernet, SCSI, or fibre channel cables. Alternatively the connection may be effected by infra-red or radio frequency data links.

FIG. 11 is a flowchart detailing the process of backing up data including backing data up to non-volatile memory.

The server generates signals (step 124). These signals are typically standard input/output signals such as SCSI commands. The tape drive processor receives the signals from the server via a data link and interrogates them to see if a "backup starting" signal is present in them (step 126), for example a rewind to start of media command followed by a write command.

If a "backup starting" signal is not contained in the server generated signals the tape drive continues to interrogate the incoming signals. However, should a "backup starting" signal be registered by the processor logging of the data and commands by writing it to a non-volatile memory element (step 128). The memory element is typically a hard disc or a solid state memory device and will typically be mirrored in another memory element.

The arrangement checks to see if there has been a tape or tape drive failure (step 130). If no failure is noted the data and commands are written to a tape in the tape drive assembly (step 132) and the input/output signals from the server are interrogated by the processor to ascertain if the backup is still in progress (step 134). Should the processor receive a termination of backup signal from the server the logging of data and commands to the memory element is terminated (step 136). If no termination of backup signal is registered by the processor the process returns to checking for a tape drive or tape failure (step 132).

Should a tape drive, or tape failure occur and be logged (step 132) the drive assembly will issue a failed peripheral signal (step 138) to notify a user of the system that the failure has occurred. In a system where a tape autochanger is provided, along with an array of tapes, the defective tape will be removed from the tape drive and replaced by an alternative, non-defective, tape (step 140).

In an alternative arrangement no check to see if there has been a tape or tape drive failure (step 130) as the incoming data is logged directly to the nonvolatile memory unit as well as being written to tape.

It will be appreciated that should a tape drive or tape failure be registered the memory element continues to log all the data and commands emanating from the server for the duration of the backup irrespective of whether an autochanger is provided or not.

FIG. 12 is a flow chart detailing an alternative method of data backup. The server generates signals (step 142). These signals are typically standard input/output signals such as SCSI commands. The tape drive processor receives the signals from the server via a data link and interrogates them to see if a "backup starting" signal is present in them (step 144).

If a "backup starting" signal is not contained in the server generated signals the tape drive continues to interrogate the incoming signals. However, should a "backup starting" the arrangement checks to see if there has been a tape or tape drive failure (step 146). If no failure is noted the data and commands are written to a tape in the tape drive assembly (step 148). However, if a tape or tape drive failure signal is registered by the processor logging of the data and commands by writing it to a nonvolatile memory element (step 150) commences. The memory element is typically a hard disc or a solid state memory device and will typically be mirrored in another memory element.

The drive assembly will issue a failed peripheral signal (step 152) to notify a user of the system that the failure has occurred. In a system where a tape autochanger is provided, along with an array of tapes, the defective tape will be removed from the tape drive and replaced by an alternative, non-defective, tape (step 154).

The input/output signals from the server are interrogated by the processor to ascertain if the backup is still in progress (step 156). Should the processor receive a termination of backup signal from the server the logging of data and commands to the memory element is terminated (step 158). If no termination of backup signal is registered by the processor any data and commands output from the server continue to be logged.

FIG. 13 is a flowchart detailing the process of data recovery from a non-volatile memory element. The necessity to recover data from the memory element is realised (step 160). This will typically be due to a backup failing to complete due to a tape failure as for example a breakage or loss of formatting information. Alternatively, it may be due to a tape drive failure for example a motor failure, a damage or failure of a read/write head or the partial or intermittent failure of an input/output line.

A data retrieval command is issued to the processor that controls the memory element (step 162). This may be an automated system command or it may be a user-generated command. The data retrieval command will typically relate to part of the data stored on the memory element as part of it will usually be recoverable from the tape. For example, if the tape drive fails two hours into a five-hour backup it may only be necessary to recover the least three hours' worth of data from the memory element. However, there may be circumstances such as the tape becoming irreparably damaged, for example fire, or the tape being stolen where it is necessary to recover the entire backup from the memory element.

The data is then recovered from the memory element (step 164). This will typically involve the output of the data (step 166) to a replacement tape. Alternatively, it may involve the uploading of data directly to a server or via a network.

In many preferred embodiments the tape drive assembly will have a tape-docking station adapted to receive, in a removable manner, a tape cassette, a tape head provided at the docking station, a non volatile memory unit, an input line, the input line being adapted to provide data signals to the memory unit and, directly or indirectly to the tape head, the arrangement being such that in use signals input via the input line are recorded in the memory unit as well as being directed to the tape head for writing to the tape.

The assembly may have an output line adapted to provide output signals of data recorded in the memory unit (e.g. for recovering data).

Tapes and tape drives have a higher, significantly higher, failure rate (when no backup/copy can be created reliably) than does, for example, hard disc memory or chip-based solid state memory. Thus a backup device that has a buffer memory that does not use tape is more reliable than one that does. Tape may have failure-to-copy rate that is an order of magnitude, or more, or two orders of magnitude, worse than hard disc (for example).

Furthermore, storing data in a non-linear storage medium with random access to the data makes it easier and faster to access just a selected portion of data.

The invention could be thought of as backing up data to a tape drive, and also having a non-volatile memory store of the data being directed to the tape drive.

The preferred method comprises storing a backup in non-volatile memory as a buffer in the event that there is a problem with backup to the tape drive, in such an event data is stored to the non-volatile memory.

It is possible to store to buffer (or non-volatile memory) anyway, even when the tape backup is going fine, or to store to buffer upon detection of a problem with tape drive backup.

It will be appreciated that in one embodiment a stand alone back up device, or unit, which has a non-volatile memory (e.g. hard drive or memory chip) acts as a first-in-first-out buffer and data to be backed up is, upon initiation of a back up operation or routine, imported into the device, or unit, from an external data host machine and is passed through the non-volatile memory, and is stored there and is passed to a tape drive for writing to a back up tape.

The tape drive may be an integral part of the back up device or unit, within the same unit housing, or the tape drive may be provided in a separate tape drive unit, and the tape drive unit and the back up unit may be linked together. It will also be appreciated that the non-volatile memory unit is intended to have enough capacity to store all of the data of a typical back up routine to back up a chosen (set or amount) of data on the host machine, and that at least some, and perhaps all, of the complete set of data backed up on the non-volatile memory is overwritten in a subsequent back up operation but is otherwise available until then. This means that if there are known problems/errors with the back up to tape, then the set of data on the non-volatile memory can be recovered. For example, it could be caused to be written to a different tape drive, or the non-volatile memory could be removable and replaceable within another, so that the backed up data on the non-volatile memory is preserved and not overwritten during the next back up operation.

In one embodiment it is preferred to have the non-volatile memory unit large enough to store a plurality of backups of data, e.g. 2, 3, 4, 5, 6, 7, or more sets. For example, it may be desirable to store at least a week's worth of backups (e.g. daily backups). Eventually, the capacity of the non-volatile memory unit will be reached and data relating to older backups will be overwritten by the new data from a new backup operation in a first-in-first out manner. Thus the non-volatile memory unit may be thought of, in some ways, as a large, possibly very large, FIFO buffer memory.

Some of the above embodiments rely upon the administrator of the back up system and routine being aware that the non-volatile memory is large enough to store the desired data until it is established that the back up to tape worked correctly. It also involves a check that the back up to tape did work correctly, and if not a remedial action to be taken to make use of/preserve the back up to non-volatile memory. This check and/or the remedial action could be performed automatically by software. Possibly the software could check if back up to tape had executed properly, and an alert could be provided to a human for them to initiate the preservation/use of the data on the non-volatile back up. The software or a human can assess from time to time whether the non-volatile memory is large enough, or whether it needs increasing. If it is established that the non-volatile memory needs increasing it may be increased.

An example is a daily, or other regular, back up of system data. A back up routine may be run and this may instruct the stand-alone back up unit to perform the back up operation. Data is fed to the non-volatile memory unit (e.g. disc, or electronic memory, or optical memory such as an optical disc), and then on to a tape drive for storing on tape. It all goes well and the system does not indicate to a system manager that the tape back up failed, the back up routine is simply run again the next day (or other regular period), with previously stored data on the hard disc being overwritten by the new backup data. If there is a problem of storing to tape, the nonvolatile memory still has the back up data on it, not yet overwritten, and the overall data host computer/system can still be used, changing the original data, with the back up on the non-volatile memory. Before overwriting the back up data on the non-volatile memory the back up data may be preserved to avoid its loss. Several days worth of backups may be kept, or a weeks worth, or several weeks worth, or more, before the data on non-volatile memory is overwritten and lost.

It will be appreciated that the size of the database, or data set, being backed up may change between different backup operations: data may be added or deleted in use of the database. However, the overall size of a large, commercially useful data set does not often change too quickly. There is usually time for the backup system to notice that a backup operation is filling too large an amount of its memory capacity, and to prompt an increase in memory capacity.

Also be referring to a backup tape or a backup disc/sold state memory, it is not necessarily intended to suggest that there is only one single disc/solid state memory or tape: more than one, or several, may be provided and they may perform as if they were equivalent to a larger memory capacity disc/solid state device, or tape, or more than one disc/solid state memory element.

What we claim is:

1. A tape drive assembly for performing a backup operation, comprising:
    a tape-receiving station arranged to receive a data storage unit including a tape arranged to store data in a data backup operation;
    a write head arranged to write data to said tape in a data backup operation;
    a non-volatile memory unit (i) located within or (ii) removably locatable within the tape drive assembly, arranged to record data in a data backup operation, and arranged to communicate data to said write head; and
    an input arranged to be connected to a data host machine, said input being arranged to pass data to said memory unit such that, in use in a data backup operation, said data is communicated from said data host machine to said input and is recorded in said memory unit prior to said data being passed from said memory unit to said write head for writing to said tape.

2. An assembly according to claim 1, wherein said memory unit is a magnetic disc, a solid state device, or an optical disc.

3. An assembly according to claim 1, further including a redundant array having a plurality of memory units.

4. A method of backing up data stored on a host data-containing machine comprising the steps of:
    (i) receiving data from said host machine at an input of a tape drive assembly;
    (ii) passing said data to a non-volatile memory unit (i) located within or (ii) removably locatable within said tape drive assembly;
    (iii) routing said data through said memory unit and recording said data in said memory unit;
    (iv) passing said data to a write head of said tape drive assembly; and
    (v) writing said data to a tape data storage unit to backup of said data to said tape data storage unit.

5. A method according to claim 4, wherein said data is successfully written and backed up to said tape data storage unit.

6. A method according to claim 4, further including executing steps (ii) and (iii) substantially simultaneously, and executing steps (iv) and (v) substantially simultaneously.

7. A method according to claim 4, further including executing steps (ii) and (iii) sequentially with steps (iv) and (v).

8. A method according to claim 4, further including determining whether said data has been successfully written to said tape data storage unit, and recovering said data from said memory unit if it is determined that said data has not been successfully written to said tape data storage unit.

9. A method according to claim 4, further including establishing a data set to be backed up and executing steps (ii) and (iii) until all of said data set to be backed up is stored in said memory unit.

10. A method according to claim 4, further including mirroring said data written in a plurality of redundant array of memory units.

11. A method according to claim 4, wherein the method is performed in said tape drive assembly which has said memory unit as an integral unit or a combined assembly, and which has a control processor associated with said memory unit or said tape drive assembly, said method further comprising causing the control processor to receive a backup operation initiation signal, the control processor causing a backup operation to be performed in response to receipt of said backup operation initiation signal, thereby backing up said data.

12. A method according to claim 4, wherein a data set to be backed up is of a generally known predetermined size, and said non-volatile memory unit is large enough to store all of the data from a plurality of backup operations, the method further comprising:

storing a plurality of successive backup operations of said data set in said non-volatile memory unit; and overwriting earlier backed-up data with new backup data in a first-in, first-out manner if there is otherwise insufficient capacity in said non-volatile memory unit to accommodate data from a new backup operation.

13. A method according to claim 4, further comprising performing a specific backup operation and ensuring that said non-volatile memory unit has a large enough capacity to store an entire data set that is to be backed up in said backup operation.

14. A method according to claim 13, further comprising ensuring that said non-volatile memory unit has a large enough capacity to store at least two data sets from at least two successive backup operations.

15. A method according to claim 14, further including using said non-volatile memory unit as a local backup, local to said tape drive.

16. A method according to claim 14, further comprising removing said tape data storage unit from said tape drive after completion of a first of said backup operations and moving said tape data storage unit geographically away from said tape drive and using said tape data storage unit as a remote backup.

17. A method according to claim 14, wherein said data set has a smaller size than said non-volatile memory unit can store and further comprising writing said complete data set to said memory unit, storing said complete data set in said memory unit, and passing said data set to said tape drive from said memory unit in a first-in, first-out manner.

18. A method according to claim 4, further comprising overwriting data previously stored in said non-volatile memory unit from an earlier backup operation with data from a later backup operation.

19. A method according to claim 4, further comprising:

determining if the backup of said data to said tape data storage unit has been achieved successfully; and performing a subsequent backup operation that overwrites data stored in said non-volatile memory unit if the backup to said tape data storage unit has been achieved successfully.

20. A method of backing up a complete data set off a host machine including data to be backed up, the backing up method being performed with a backup device separate from said host machine, said device including a tape drive arranged to receive associated removable tape data storage units and an associated non-volatile memory unit, the non-volatile memory unit being (i) located within or (ii) removably locatable within said tape drive, the method comprising writing data to be backed up to said non-volatile memory unit prior to writing said data to a first tape data storage unit in said tape drive in a first backup routine.

21. A method according to claim 20, further comprising:

(iii) inserting another tape data storage unit into said tape drive;

(iv) determining if data was successfully backed up to said tape data storage unit during said first backup routine;

(v) performing a second backup routine, subsequent to said first backup routine and after said data set in said host machine has changed; and (vi) overwriting data stored in said non-volatile memory unit during said first backup routine with a new data set from said host machine during said second backup routine, said second backup routine also writing said new data set to said another tape data storage unit.

22. A network comprising:

a data source having a data set to be backed up; and a backup unit, said backup unit comprising a tape drive assembly, the tape drive assembly comprising a read/write head and a non-volatile memory unit, the non-volatile memory unit being (i) located within or (ii) removably locatable within the assembly, the non-volatile memory unit having a data storage capacity that can accommodate at least one copy of said data set, said backup unit having an input for communicating with said data source and an output for outputting output data obtained from said tape drive assembly and from said memory unit, said input being arranged to communicate data coming from said data source with said memory unit for storing said data set at said memory unit, said memory unit being arranged to communicate with said read/write head so as to write said data set to a tape data storage unit arranged to be located in said tape drive assembly.

23. A tape library comprising:

at least one tape drive and a plurality of tape data storage units;

automatic tape data storage unit location and manipulation apparatus for (a) locating said tape data storage units and (b) loading and unloading said tape data storage units into and out of said tape drive;

a non-volatile memory unit (i) located within or (ii) removably locatable within said at least one tape drive so as to provide a tape drive assembly comprising:

a tape-receiving station arranged to receive a tape data storage unit arranged to store data;

a write head arranged to write data to said tape data storage unit;

said non-volatile memory unit; and an input, said input being arranged to pass data to said memory unit such that, in use, said data is recorded in said memory unit prior to passing said data to said write head.

24. A computer-readable medium bearing a program which, when run on a processor of a backup system including both a tape drive having a tape received therein, and a non-volatile memory unit being (i) located within or (ii) removably locatable within said tape drive, said program being arranged to cause the processor to access data being backed up during a backup routine and to copy the data to the non-volatile memory unit prior to writing the data to the tape, in use during said backup routine.

25. A computer-readable medium according to claim 24, wherein said program is arranged to cause retrieval of said data from said non-volatile memory unit.

26. A tape drive assembly for performing a backup operation, comprising:

a tape receiving station arranged to receive a data storage unit, said data storage unit comprising a tape arranged to store data in a data backup operation;

a write head arranged to write data to said tape in a data backup operation;

a non-volatile memory unit arranged to record data in a data backup operation and arranged to communicate data to said write head; and an input arranged to be connected to a data host machine, said input being arranged to pass data to said memory unit such that, in use in a data backup operation, said data is communicated from said data host machine to said input and is recorded in said memory unit prior to said data being passed directly from said memory unit to said write head for writing to said tape.

27. A tape drive assembly according to claim 26 wherein the non-volatile memory unit is (i) located within or (ii) removably locatable within the tape drive assembly.

28. A tape drive assembly for performing a backup operation, comprising:

a tape-receiving station arranged to receive a data storage unit including a tape arranged to store data in a data backup operation;

a write head arranged to write data to said tape in a data backup operation;

a non-volatile memory unit arranged to record data in a data backup operation and arranged to communicate data to said write head, the non-volatile memory unit being (i) located within or (ii) removably locatable within the tape drive assembly; and an input arranged to be connected to a data host machine, said input being arranged to pass data to said memory unit such that, in use in a data backup operation, said data is communicated from said data host machine to said input and is recorded in said memory unit prior to said data being passed from said memory unit to said write head for writing to said tape, and said memory unit being arranged to overwrite data stored on it.

29. A tape drive assembly according to claim 28, wherein the non-volatile memory unit is arranged to act as short-term data storage.

30. A tape drive assembly according to claim 28, wherein the non-volatile memory unit is arranged to overwrite data stored on it in a first-in, first-out manner.

31. A tape drive assembly according to claim 28, wherein said memory unit is arranged to overwrite said data stored on it in response to the memory unit reaching its data storage capacity.

32. A tape drive assembly for performing a backup operation, comprising:

a tape-receiving station arranged to receive a data storage unit including a tape arranged to store data in a data backup operation;

a write head arranged to write data to said tape in a data backup operation;

a non-volatile memory unit (i) located within or (ii) removably locatable within the tape drive assembly, arranged to record data in a data backup operation and arranged to communicate data to said write head; and an input arranged to be connected to a data host machine, said input being arranged to pass data to said memory unit such that, in use in a data backup operation, said data is communicated from said data host machine to said input and is recorded in said memory unit prior to said data being passed from said memory unit to said write head for writing to said tape, the non-volatile memory unit being arranged to output at least a portion of said data recorded on it upon receiving a signal indicative of a failure in reading said data written on said tape.

33. A tape drive assembly for performing a backup operation, comprising:

a tape receiving station arranged to receive a data storage unit including a tape arranged to store data in a data backup operation;

a write head arranged to write data to said tape in a data backup operation;

a non-volatile memory unit (i) located within or (ii) removably locatable within the tape drive assembly, and arranged to record data in a data backup operation and arranged to communicate data to said write head;

an input arranged to be connected to a data host machine, said input being arranged to pass data to said memory unit such that, in use in a data backup operation, said data is communicated from said data host machine to said input and is recorded in said memory unit prior to said data being passed from said memory unit to said write head for writing to said tape, the non-volatile memory unit being arranged to output at least a portion of said data recorded thereupon upon receiving a signal indicative of a failure in writing said data to said tape.

34. A method of improving the safety of backed-up data, the method being performed with a backup device separate from a host machine, said device including a tape drive arranged to receive associated removable tapes and an associated non-volatile memory unit being (i) located within or (ii) removably located within, said tape drive, the method comprising the steps of:

(a) writing data to be backed up to said non-volatile memory unit prior to writing said data to a tape data storage unit removably located in said tape drive in a first backup routine; and (b) physically separating the tape data storage unit and the non-volatile memory unit.

35. The method of claim 34, wherein the non-volatile memory unit is removed from the tape drive and is taken to a place remote front the backup device.

36. The method of claim 35, wherein the tape data storage unit is removed from the tape drive and is taken to a location remote from the backup device.

37. The method of claim 34, wherein the tape data storage unit is removed from the tape drive and is taken to a place remote from the backup device and the non-volatile memory unit remains within the tape drive.

* * * * *